United States Patent Office 3,225,170
Patented Dec. 21, 1965

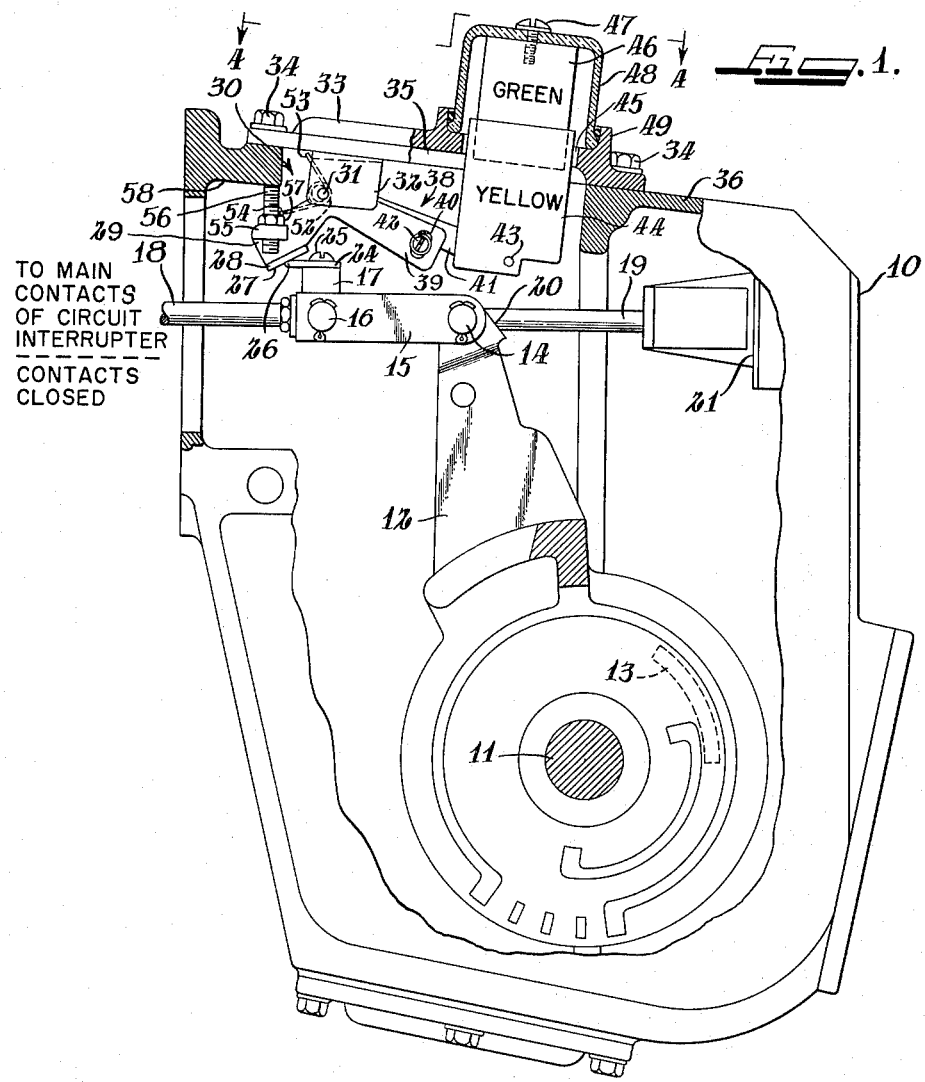

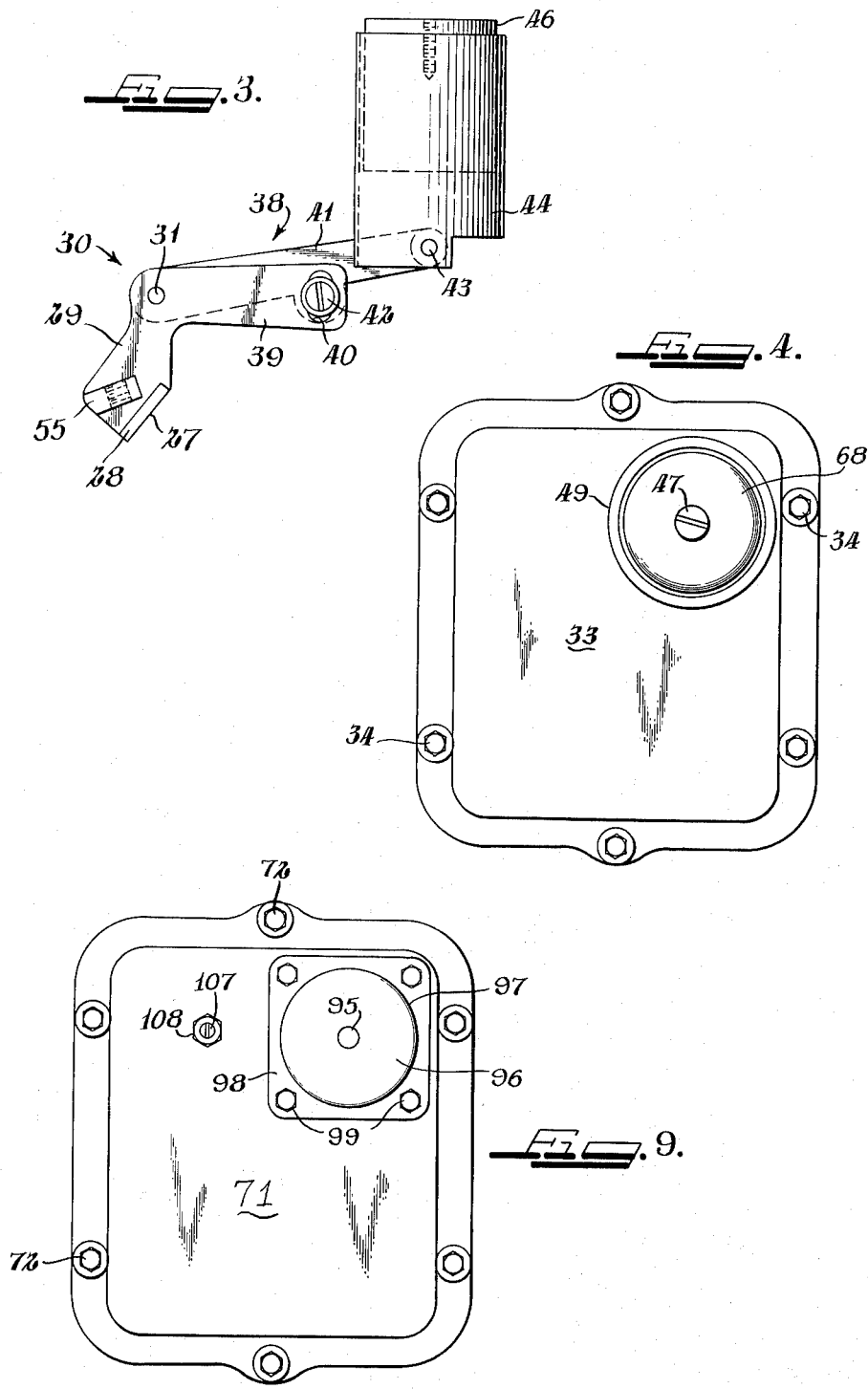

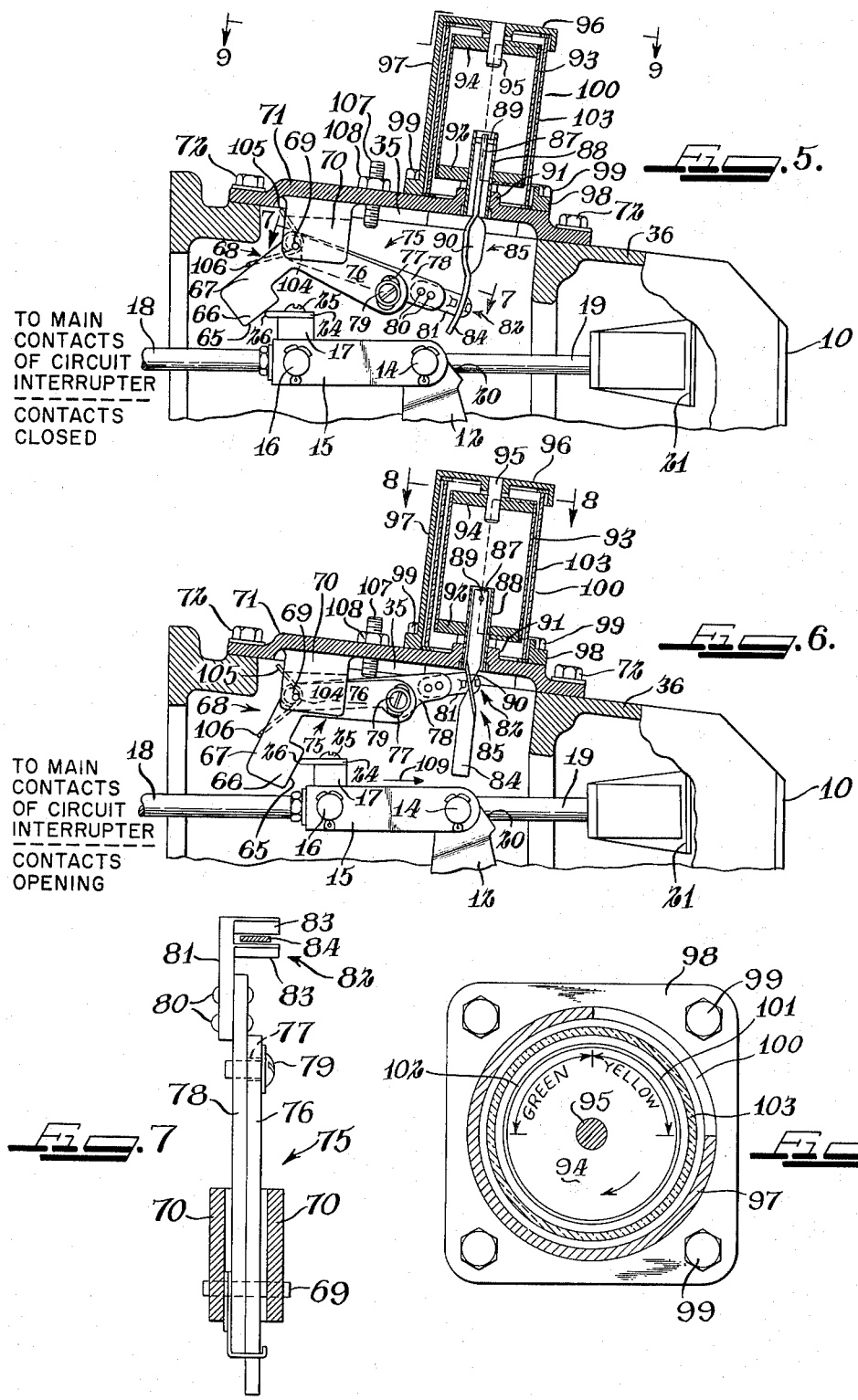

3,225,170
MEANS FOR INDICATING THE POSITION OF THE CONTACTS OF A CIRCUIT INTERRUPTER
Leonard V. Chabala, Maywood, and Quentin H. Wherfel, Chicago, Ill., assignors to S & C Electric Company, Chicago, Ill., a corporation of Delaware
Filed Mar. 9, 1964, Ser. No. 350,499
11 Claims. (Cl. 200—167)

This invention relates, generally, to the construction of high voltage circuit interrupters and it has particular relation to contact position indicating means therefor.

In circuit interrupters of the kind and character shown in United States W. A. Gussow et al., Patent No. 3,030,481, issued April 17, 1962, the position of the separable contacts, particularly the separable main contacts, is not visible. It is desirable that there be a visible positive indication of the position of the separable main contacts in order to show to the switch operator the circuit conditions that exist through the switch. He can then positively determine what action he should take in view of such knowledge.

Among the objects of this invention are: To provide a positive, visible indication of the position of the invisible separable contacts of a high voltage circuit interrupter; to indicate that the contacts are open until they are fully closed; to employ a mechanically movable indicator and to shift it from one position to another position during the final closing movement of the contacts as a result of movement of a contact operating member through a relatively long stroke only the final portion of which is used to shift the indicator; to convert the translatory movement of the contact operating member into rotary movement for operating an indicator from significant contact closure indicating position to another during the final portion of the closing stroke and the initial portion of the opening stroke; to operate the indicator with a translatory movement; and to operate the indicator with a rotary movement.

In the drawings:

FIG. 1 is a view, partly in horizontal section and partly in plan, showing one embodiment of the present invention adapted to the contact operating mechanism shown in the patent above referred to, the mechanism being shown in the position thereof corresponding to the closed position of the contacts.

FIG. 2 is a view, similar to FIG. 1, and shows the contact operating mechanism moving toward the position corresponding to the contact open position, the movement illustrated being only a relatively small portion of the entire opening stroke sufficient to shift the indicator from one significant position to the other.

FIG. 3 is a plan view, at an enlarged scale, showing more clearly certain details of construction of the actuating lever and indicator for the embodiment of the invention shown in FIGS. 1 and 2.

FIG. 4 is a view taken generally along the line 4—4 of FIG. 1 and showing the cover having the cup shaped window mounted thereon through which the position of the indicator can be viewed.

FIG. 5 is a view, similar to FIG. 1, showing another embodiment of the invention, the contact operating mechanism being shown in the position that it occupies when the contacts are closed.

FIG. 6 is a view, similar to FIG. 5, and shows the position of the contact operating parts and associated mechanism after it has moved through a relatively small portion of the opening stroke but through an extent sufficient to shift the indicator from one significant position to the other, the indicator here shown being mounted for rotary rather than translatory movement.

FIG. 7 is a vertical sectional view taken generally along the line 7—7 of FIG. 5.

FIG. 8 is a vertical sectional view taken generally along the line 8—8 of FIG. 6.

FIG. 9 is an elevational view taken generally along the line 9—9 of FIG. 5 and shows the cover with the housing for the indicator mounted thereon.

Referring now particularly to FIG. 1 of the drawings, it will be observed that the reference character 10 designates a mechanism housing in which only a portion of the operating mechanism, described in detail in the patent above referred to, is illustrated. Extending through the mechanism housing 10 is a switch operating shaft 11 that is arranged to be rotated for effecting certain sequential switch operating functions all as described in this patent. Mounted to rotate on the shaft 11 is a main operating arm 12 that is arranged to be biased by a spring 13 in a clockwise direction as viewed in FIG. 1 for effecting movement of the main contacts of the circuit interrupter to the open position. Suitable latch mechanism is provided for holding the main operating arm 12 in the position shown in FIG. 1 against the biasing action of the spring 13. Pivotally connected at 14 to the distal end of the main operating arm 12 is a pair of links 15, only one of which is shown. At the other end of the pair of links 15 they are pivotally connected at 16 to a cross head 17 to which a main contact operating rod 18 is connected and guided for translatory movement. A guide rod 19 assists in the guiding action of the main contact operating rod 18. The main operating arm 12 is provided at its distal end with a face 20 that is arranged to engage a bumper 21 at the end of the opening stroke.

Preferably provision is made for moving the main contact operating rod 18 with a translatory movement through a relatively long stroke. For illustrative purposes it is pointed out that the movement between the open and closed positions of the main contact operating rod 18 may be of the order of four inches.

As pointed out above, it is desirable that provision be made for indicating whether the contacts operated by the main contact operating rod 18 are in the fully closed position. The indication should be given substantially only if they are in the fully closed position and the indication preferably is such that they are not indicated as being in the closed position unless they actually occupy this position.

In order to provide such an indication an actuating finger 24 is secured by screws 25 to an extending part of the cross head 17. The actuating finger 24 has a rounded end 26 that is arranged to engage an inclined surface 27 on a flange 28 that is integral with one arm 29 of an actuating lever that is indicated, generally, at 30. It will be noted that the surface 27 is inclined to the direction of translatory movement of the main contact operating rod 18 which is along its longitudinal axis. The actuating lever 30 is arranged to be pivotally mounted at 31 on a pair of flanges 32 that are integral with and extend inwardly from a cover 33. The cover 33 is secured to the mechanism housing 10 by bolts 34 and it extends over an opening 35 in a side wall 36. The actuating lever 30 is arranged to rotate in the plane in which the longitudinal axis of the main contact operating rod 18 is located.

It will be observed that the actuating lever 30 is a lever of the first class and that its other arm, indicated generally at 38, includes a part 39 that is integral with the one arm 29. The construction is shown more clearly in FIG. 3. Here it will be observed that the part 39 has a slot 40 and that another part 41 underlies the part 39 and is pivoted about the same pivot 31 about which the actuating lever 30 is pivoted. A clamp screw 42 extends through the slot 40 and is threaded into the other part 41 to facilitate shifting the relative angular position of the parts 39 and 41 to permit adjustment of the mechanism.

At its distal end the other part 41 of the other arm 38 carries a transverse pin 43 the axis of which is parallel to the axis of the pivot at 31 with both being perpendicular to the plane containing the longitudinal axis of the main contact operating rod 18.

The transverse pin 43 is attached at its ends to the opposite sides of a hollow cylindrical indicator or target sleeve 44 that is mounted for translatory movement through the opening 35 in the side wall 36 and also through an opening 45 in the cover 33. The indicator or target sleeve 44 is guided in its translatory movement by a cylindrical guide or stationary target 46 that is secured in position by a screw 47 that extends through the bottom of a cup shaped window 48 that is formed of suitable transparent material, such as methylmethacrylate resin. The open end of the cup shaped window 48 is telescoped with an annular flange 49 that is integral with the cover 33 and is suitably secured therein.

In FIG. 1 the indicator or target sleeve 44 is shown as being fully withdrawn from view through the cup shaped window 48. In this position the main contact operating rod 18 is in a position corresponding to the closed position of the contacts. In order to clearly show this, the guide or stationary target 46 preferably carries a distinctive color, as indicated green. The indicator or target sleeve 44 carries a contrasting color, indicated yellow, and is arranged, as shown in FIG. 2, to telescope completely over the guide or stationary target 46 with the result that only the indicator or target sleeve 44 can be viewed through the cup shaped window 48. When the indicator or target sleeve 44 is in this position as shown in FIG. 2, there is given a positive visible indication that the main contact operating rod 18 is not in a position corresponding to the fully closed position of the contacts operated thereby.

With a view to biasing the indicator or target sleeve 44 to the position shown in FIG. 2, a torsion spring 52 is employed. It is positioned around the pivot 31 with one end 53 reacting against the inner surface of the cover 33 while the other end 54 reacts against the adjacent side of the one arm 29 of the actuating lever 30.

The one arm 29 of the actuating lever 30 has an integral upstanding threaded lug 55 for receiving an adjusting screw 56. A lock nut 57 serves to hold the adjusting screw 56 in position. The adjusting screw 56 is arranged to bear against the shoulder 58 on the mechanism housing 60 and thereby limits the extent of movement of the indicator or target sleeve 44 into the mechanism housing 10. The adjustment of the screw 56 is such as to permit the movement of the main contact operating rod 18 to the position corresponding to the fully closed position of the main contacts. It will be understood that, in moving toward the open position the main contacts are arranged to maintain the continuity of the circuit for a limited portion of the full opening stroke or a limited portion of the stroke of the main contact operating rod 18 moving from the contact closed position to the full open position.

FIG. 2 shows movement of the main contact operating rod 18 in the direction indicated by the arrow 59 toward the open circuit position. Although only a relatively small portion of the full stroke of movement of the main contact operating rod 18 has been effected, for example a movement of the order of 9/16", the relationship of the actuating finger 24 to the inclined surface 27 and the relative lengths of the arms 29 and 38 of the actuating lever 30 is such that the indicator or target sleeve 44 has moved from the position shown in FIG. 1 to the position shown in FIG. 2 where only the indicator or target sleeve 44 is visible through the cup shaped window 48. Further rotation of the actuating lever 30 and translatory movement of the indicator or target sleeve 44 is prevented by engagement of the latter with the bottom of the cup shaped window 48. However, the main contact operating rod 18 continues to move in the direction indicated by the arrow 59 until the face 20 on the distal end of the main operating arm 12 makes contact with the bumper 21.

When the main operating arm 12 is rotated in the opposite direction to move the main contact operating rod 18 in a direction to close the contacts, the indicator or target sleeve 44 remains in the position shown in FIG. 2 until near the end of the closing stroke. Then the rounded end 26 of the actuating finger 24 engages the inclined surface 27 on the flange 28. Continued movement of the main contact operating rod 18 in the closing direction rocks the actuating lever 30 in a clockwise direction about the pivot 31 and further tensions the torsion spring 52 which previously had rocked the actuating lever 30 in the opposite direction to move the indicator or target sleeve 44 to the position shown in FIG. 2. The continued movement of the main contact operating rod 18 to the position corresponding to the fully closed position of the contacts continues to rock the actuating lever 30 which withdraws the indicator or target sleeve 44 from the cup shaped window 48 to the position shown in FIG. 1 where the guide or stationary target 46 is fully exposed to view.

FIGS. 5 to 9 show another embodiment of the present invention. Insofar as the parts shown in these figures are the same as shown in FIGS. 1 to 4, the same reference characters are employed.

Referring now particularly to FIG. 5 of the drawings, it will be observed that the rounded end 26 of the actuating finger 24 engages an inclined surface 65 on a lateral extension 66 from one arm 67 of an actuating lever that is indicated, generally, at 68. It will be understood that the surface 65 is inclined relative to the longitudinal axis of the main operating rod 18 along which it is translatorily movable between the open and closed contact positions. Further, it will be understood that the actuating lever 68 is pivotally mounted at 69 to rotate in a plane containing the longitudinal axis of the main contact operating rod 18. The actuating lever 68 is mounted pivotally at 69 between a pair of flanges 70, FIG. 7, that are formed integrally with and extend inwardly from a cover 71 that is secured in position by bolts 72 over the opening 35 in the side wall 36 of the mechanism housing 10. The actuating lever 68, like the actuating lever 30, is a lever of the first class and its other arm, shown generally at 75, includes a part 76 that is integral with the one arm 67 and is provided with a slot 77. Another part 78 of the other arm 75 underlies the part 76 and at one end is rotatable about the pivot 69. A clamp screw 79 extends through the slot 77 and is threaded into the part 78 to permit adjustment of the relative angular relationship between the parts 76 and 78.

At the distal end of the part 78 the other arm 75 has secured thereto by rivets 80 a guide 81 that may be made of plastic material such as nylon. The guide 81 has a bifurcated end 82 comprising branches 83—83 that extend laterally and parallel to the pivot axis 69. The branches 83—83 are arranged to receive therebetween an end portion 84 of a resilient flat strip 85 of suitable metal the other end portion 87 of which extends into a sleeve 88 and is secured thereto at its inner end against rotation by a transverse pin 89. The resilient flat strip 85 has a twisted intermediate section 90 that is arranged such that the end portions 84 and 87 are twisted 180° away from each other with the result that corresponding sides face in opposite directions. The sleeve 88 is journaled in a bearing portion 91 that is formed integrally with the cover 71. When the actuating lever 68 is rocked from the position shown in FIG. 5 to the position shown in FIG. 6 on initial movement of the main contact operating rod 18 from the position corresponding to the fully closed contact position toward the open position, the flanges 83—83 of the bifurcated end 82 of the guide 81 move along the end portion 84. It will be recalled that the flat strip 85 is resilient and flexible and thus readily accommodates the rotary movement of the distal end of the arm 75. Continued rotation of the actuating lever 68 in a counterclockwise direction brings the branches 83—83 to the twisted intermediate section 90 with the result that the flat strip 85 is rotated in accordance with the extent that the intermediate section 90 is twisted. It is assumed that it is twisted to such an extent that, on movement of the guide 81 to the position shown in FIG. 6, the flat strip 85 and the sleeve 88 are rotated through 90°.

Advantage is taken of the rotation of the sleeve 88 to mount an end disc 92 thereon for rotation therewith. The end disc 92 carries a cylindrical indicator 93 the other end of which is provided with an end disc 94 that is journaled on a pin 95 which extends through a cap portion 96 of a metallic housing 97. As shown in FIGS. 8 and 9 the housing 97 is provided with a rectangular flange 98 at its base that is secured by bolts 99 to the outer side of the cover 71. A portion of the cylindrical indicator 93 is visible through an opening 100 in the body portion of the cylindrical housing 97. In order to detect a shift in the position of the cylindrical indicator 93, it is provided with contrasting color sections 101 and 102 along its outer surface as shown in FIG. 8. For example the section 101 can carry a yellow color while the section 102 carries a green color. It will be understood that the section 101 is visible through the opening 100 in the housing 97 when the main contact operating rod 18 has been moved to the position shown in FIG. 6. When the main contact operating rod 18 is in the position shown in FIG. 5, then only the section 102 is visible through the opening 100 in the housing 97.

With a view to protecting the cylindrical indicator 93 from the weather, a transparent cylinder 103 is telescoped over it and is suitably secured within the housing 97 and its ends are sealed against the entrance of moisture.

For biasing the actuating lever 68 in a counterclockwise direction to rotate the cylindrical indicator 93 from its position as shown in FIG. 5 to the position shown in FIG. 6 a torsion spring 104 is positioned around the pivot 69 with one end 105 bearing against the inside of the cover 71 while the other end 106 bears against the arm 67 of the actuating lever 68. The extent of rotation of the actuating lever 68 in a counterclockwise direction is controlled by an adjusting screw 107 that is threaded in the cover 71. A lock nut 108 serves to hold the adjusting screw 107 in position.

When the main contact operating rod 18 is in the position shown in FIG. 5, which corresponds to the fully closed position of the main contacts, the indicator portion 102 of the cylindrical indicator 93 only is visible through the opening 100 in the housing 97. On movement of the main contact operating rod 18 in the direction indicated by the arrow 109 toward the open position, FIG. 6, the actuating lever 68 is permitted to rotate in a counterclockwise direction under the influence of the torsion spring 104. In the manner described, the flat strip 85 is rotated and carries with it the cylindrical indicator 93 until the portion 102 is moved out of registry with the opening 100 and the portion 101 is moved into registry therewith as shown in FIG. 8. This movement of the indicator 93 takes place during only a small portion of the stroke of the main contact operating rod 18. For example, during the first movement of the main contact operating rod 18 through about 9/16″, the actuating lever 68 is permitted to rotate from the position shown in FIG. 5 to the position shown in FIG. 6. The main contact operating rod 18 then continues to move to the full end of the opening stroke the full length of which is of the order of four inches. On the return movement of the main contact operating rod 18 to close the contacts, it is only during the final portion of the closing movement that the actuating finger 62 engages the inclined surface 65 of the lateral extension 66 on the arm 67 to rotate the actuating lever 68 from the position shown in FIG. 6 back to the position shown in FIG. 5.

What is claimed as new is:

1. Contact position indicating means for a high voltage circuit interrupter having separable contacts hidden from view comprising:
   (a) a mechanism housing,
   (b) an operating arm rotatable in said housing about a fixed axis,
   (c) a contact operating member pivotally connected to the distal end of said operating arm and translatorily movable therewith between one position corresponding to a first position of said contacts and another position corresponding to a second position of said contacts,
   (d) an actuating lever pivotally mounted on said housing about an axis parallel to said operating arm axis with one arm in the path of a part of said contact operating member in its movement toward said one position,
   (e) an indicator mounted on said housing and movable from a first position corresponding to said first position of said contacts to a second position corresponding to said second position of said contacts,
   (f) means operatively interconnecting said indicator and said lever to move said indicator between said first and second position, and
   (g) means biasing said indicator toward one of its positions.

2. The invention, as set forth in claim 1, wherein:
   (a) the actuating lever is a first class lever,
   (b) the biasing means is a spring reacting between the housing and the one arm of said actuating lever.

3. The invention, as set forth in claim 1, wherein:
   (a) the other arm of the actuating lever includes one part integral with the one arm thereof and another part movable with respect to said one part and connected to the indicator, and
   (b) means for clamping said parts together in various relative positions to change the position of said indicator relative to said actuating lever.

4. The invention, as set forth in claim 1, wherein:
   (a) the one arm has a surface inclined to the direction of translatory movement of the contact operating member, and
   (b) an actuating finger carried by said contact operating member is arranged and adapted to engage said inclined surface on movement of said contact operating member toward its one position for sliding engagement therewith to rotate the actuating lever against the biasing action of the spring and thereby effect a corresponding movement of the indicator.

5. The invention, as set forth in claim 1, wherein:
   (a) the contact operating member has a relatively long stroke in moving from the one to the other position, and
   (b) the part of said contact operating member engages the one arm of the actuating lever during a relatively small portion of the stroke of the former and during the final portion of its movement toward said one position whereby the entire movement of the indicator from its second position to its first position is effected during said relatively small portion of said stroke.

6. Contact position indicating means for a high voltage circuit interrupter having separable contacts hidden from view comprising:
   (a) a mechanism housing,
   (b) an operating arm rotatable in said housing about a fixed axis,
   (c) a contact operating member pivotally connected to the distal end of said operating arm and translatorily movable therewith between one position corresponding to the closed position of said contacts and another position corresponding to an open position of said contacts,
(d) an actuating lever pivotally mounted on said housing about an axis parallel to said operating arm axis with one arm in the path of a part of said contact operating member in its movement toward said one position,
(e) an indicator movable endwise from a first position inside said housing through a wall thereof to a second position outside of said housing,
(f) means operatively interconnecting said indicator and said lever to move said indicator between said first and second positions, and
(g) means biasing said indicator toward said second position.

7. The invention, as set forth in claim 6, wherein:
(a) the indicator is cylindrical in configuration and is pivotally connected to the lever,
(b) a transparent cup shaped window is mounted on the mechanism housing into which said cylindrical indicator is movable, and
(c) guide means carried by said cup cooperate with said indicator to direct its movement into and out of the same.

8. The invention, as set forth in claim 7, wherein the visible surfaces of the indicator and of the guide means are of contrasting colors.

9. Contact position indicating means for a high voltage circuit interrupter having separable contacts hidden from view comprising:
(a) a mechanism housing,
(b) an operating arm rotatable in said housing about a fixed axis,
(c) a contact operating member pivotally connected to the distal end of said operating arm and translatorily movable therewith between one position corresponding to the closed position of said contacts and another position corresponding to an open position of said contacts,
(d) an actuating lever pivotally mounted on said housing about an axis parallel to said operating arm axis with one arm in the path of a part of said contact operating member in its movement toward said one position,
(e) an indicator mounted exteriorly of said housing to rotate between a first and a second position about an axis perpendicular to a plane containing the axis of rotation of said actuating lever,
(f) means operatively interconnecting said indicator and said actuating lever to rotate said indicator between said first and second positions on corresponding rotation of said actuating lever, and
(g) means biasing said actuating lever to rotate it in a direction opposite to the direction in which it is rotated by said contact operating member in its movement toward said one position.

10. The invention, as set forth in claim 9, wherein:
(a) a flat strip is connected to the indicator and extends therefrom along its axis of rotation into the housing
(b) said flat strip has a twisted intermediate portion whereby the corresponding sides of the end portions face in different directions, and
(c) a bifurcated guide on the actuating lever cooperates with said twisted intermediate portion of said flat strip to rotate said indicator between its first and second positions on corresponding rotation of said actuating lever.

11. The invention, as set forth in claim 10, wherein at least that end portion of the flat strip extending through the bifurcated guide is flexible to accommodate the swinging movement of the actuating lever.

References Cited by the Examiner
UNITED STATES PATENTS

| | | | |
|---|---|---|---|
| 2,448,166 | 8/1948 | Adams | 200—167 |
| 3,109,410 | 11/1963 | Ver Nooy | 116—124 |

KATHLEEN H. CLAFFY, *Primary Examiner.*